(No Model.) 2 Sheets—Sheet 1.
A. GARTNER.
ELECTRIC MOTOR AND REGULATOR.
No. 404,533. Patented June 4, 1889.
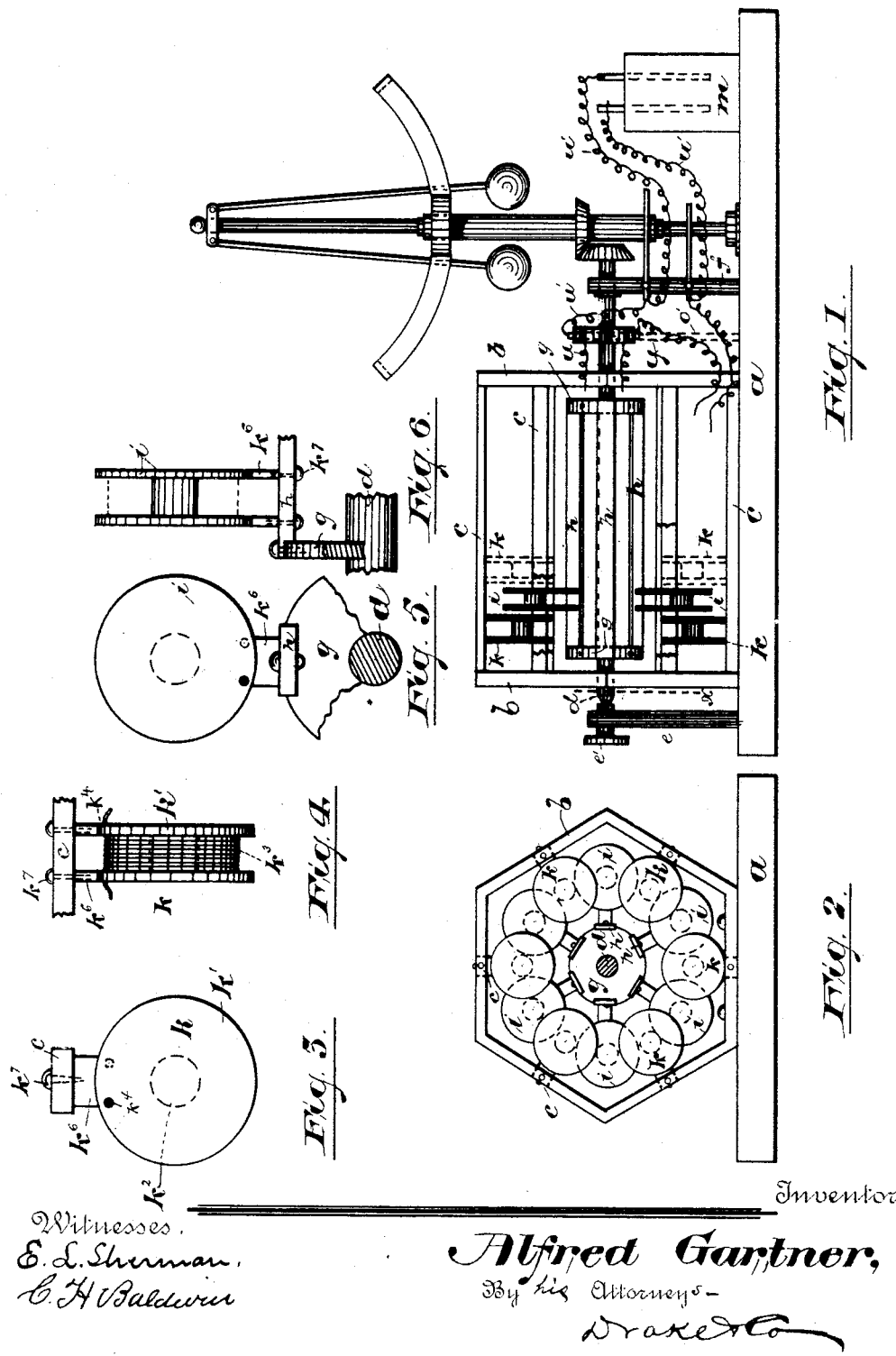
Witnesses:
E. L. Sherman
C. H. Baldwin
Inventor:
Alfred Gartner,
By his Attorneys
Drake & Co.

(No Model.) 2 Sheets—Sheet 2.

A. GARTNER.
ELECTRIC MOTOR AND REGULATOR.

No. 404,533. Patented June 4, 1889.

Witnesses:
E. L. Sherman
C. H. Baldwin

Inventor:
Alfred Gartner,
By his Attorneys
Drake & Co.

UNITED STATES PATENT OFFICE.

ALFRED GARTNER, OF NEWARK, NEW JERSEY, ASSIGNOR, BY MESNE ASSIGNMENTS, TO THE CONTINENTAL MOTOR AND ELECTRICAL COMPANY, OF SAME PLACE.

ELECTRIC MOTOR AND REGULATOR.

SPECIFICATION forming part of Letters Patent No. 404,533, dated June 4, 1889.

Application filed July 5, 1888. Serial No. 278,993. (No model.)

*To all whom it may concern:*

Be it known that I, ALFRED GARTNER, a subject of the Emperor of Austria-Hungary, residing at Newark, in the county of Essex and State of New Jersey, have invented certain new and useful Improvements in Electric Motors and Regulators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure greater efficiency of power and provide a more simple and less costly motor; and it consists in the improved electric motor and in the arrangements and combinations of parts, substantially as will be hereinafter set forth, and finally embodied in the clauses of the claim.

Figure 7:
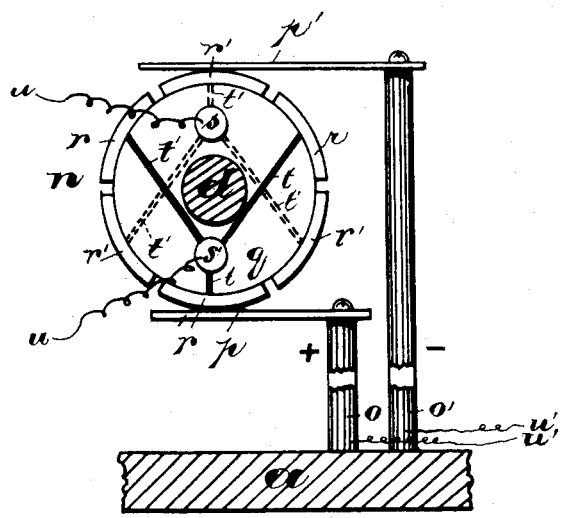
Figure 8:
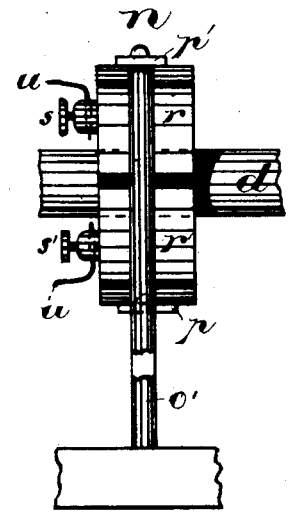
Figure 9:
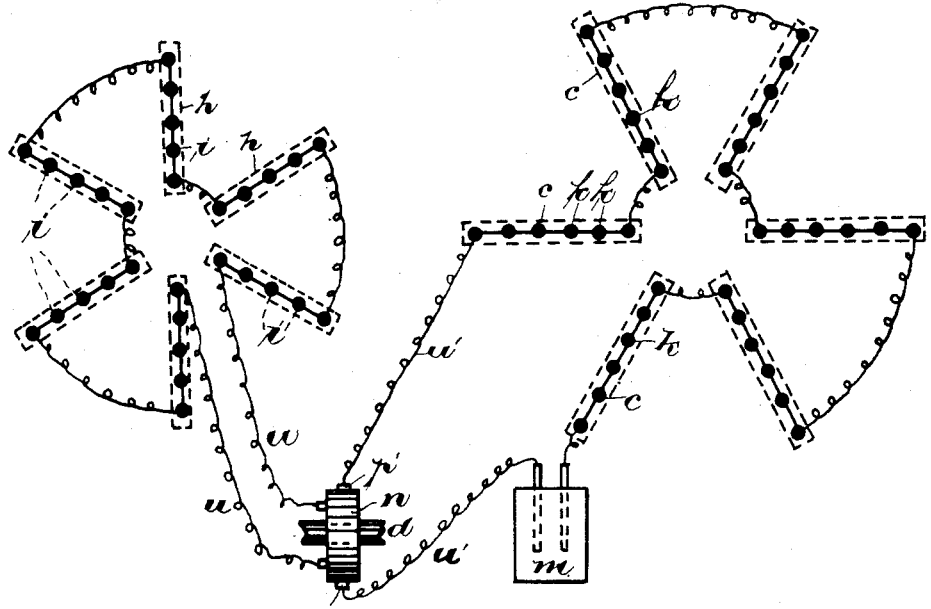

Referring to the accompanying drawings, embraced in two sheets, in which like letters of reference indicate corresponding parts in each of the several figures, Figure 1 is a side elevation of a motor and co-operating parts, showing the same with but a part of the magnets usually employed therewith. Fig. 2 is a sectional view of the motor taken on line $x$, Fig. 1. Figs. 3 and 4 are detail views of the fixed electro-magnets of said motor; and Figs. 5 and 6 are detail views of certain revolving magnets. Figs. 7 and 8 are detail views of the commutator, Fig. 7 being a section taken on line $y$, Fig. 1. Fig. 9 is a plan illustrating the connection of the electro-magnets with the commutator and the battery.

In said drawings, $a$ indicates a suitable bed-plate, which may be of wood, metal, or other suitable material, upon which frames $b\,b$, connected together by cross bars or pieces $c\,c$, are secured or formed. Said frames are approximately annular or provide a series of bearings at equal distances from a main shaft $d$, which latter extends centrally through said frames, substantially as shown in Figs. 1 and 2. Said shaft is arranged on bearings $e$ and $f$, one of which consists of a post and screw $e'$, the latter of which is provided with a socket to receive the conical end of the shaft and allow of a ready adjustment or removal of said shaft. Adjacent to the frames $b\,b$ the shaft $d$ is provided with collars or wheels $g\,g$, which are connected by cross-bars $h$, extending parallel with said shaft and with the cross-pieces $c\,c$, or approximately so, and said cross-bars $h$ provide bearings for a series of magnets $i$, which revolve with said shaft under the influence of electro-magnetism.

On the cross-bars $c\,c$ are arranged co-operating electro-magnets $k\,k$; these are arranged to alternate with the movable electro-magnets, substantially as indicated in Fig. 1, so that the broad opposite faces of each of the movable magnets are presented to those of the fixed magnets as the said movable magnets revolve with the shaft. Said electro-magnets consist of soft-iron spools, as shown in Figs. 3, 4, 5, and 6, having broad end plates $k'\,k'$ and a hub $k^2$, all formed of one integral piece, and winding-wires $k^3$, disposed between said end plates and extending oppositely through holes or passages $k^4$ in said end plates. The end plates being broad and the hub comparatively narrow in diameter, a deep receptacle is provided, adapted to receive a considerable number of windings of the wire and a proportionately great magnet-power in the soft iron. The peripheries of the end plates are provided with suitable bearings or means—such as the extensions $k^6$ and screws or pins $k^7$—whereby the said end plates are secured on the frame of the motor or upon the bars $h$ of the shaft.

The spools or magnet-plates are in series, both on the fixed cross-bars of the frames and on the shaft, and are connected as indicated or illustrated by Fig. 9, where the bars $h$ and $c$ and the magnets thereon and connecting-wires $u\,u'$ are laid out on a plane.

The magnets are arranged in series on the frame and on the shaft in alternating and parallel planes, the revolving magnets moving in a path between the fixed ones, so that the broad end plates of the movable set of magnets are brought into close adjacency with those of the fixed ones, as will be understood upon reference to Figs. 1 and 2.

The conducting-wires $u$, as illustrated in said Fig. 9, convey the current from the battery $m$ through the fixed magnets $k\ k$, (or, if desired, through the movable ones in a reverse direction,) passing first through the series of spools on one cross-bar of the frame, and thus to the next series on the next adjacent crossbar, as indicated. From the said magnets $k$ the wires conduct the current of electricity to a commutator or rheotrope $n$, (shown in Figs. 7 and 8,) by which the current is inverted. Said commutator may be of any ordinary construction; but for purposes of economy and simplicity I prefer the one shown in Figs. 1, 7, and 8.

From the commutator the electricity is transmitted to the revolving magnets, passing regularly through the succession of series, and from thence back to the commutator, and from thence to the battery, as will be clearly understood upon reference to Fig. 9.

Referring now to the commutator or rheotrope which I prefer to employ, $o\ o'$ are studs carrying springs $p\ p'$, adapted to engage the periphery of the commutator or rheotrope on the opposite sides thereof, as indicated in Fig. 7. The revolving portion of the commutator consists in a disk or plate $q$, of insulating material—such as hard rubber—around which is arranged a tubular section of brass or other metal cut into the six parts $r\ r'$, more or less, which alternately connect with opposite poles of the circuit by means of screws $s\ s'$, wires $t$, and conducting-wires $u$. Said conducting-wires $u$ connect one set of alternate parts, particularly the set marked $r$, with the collection or group of revolving magnets at one end or pole of said collection, and the other set of parts $r'$ connect with the opposite end of said collection, as indicated more particularly in Fig. 9.

The springs $p\ p'$, which engage the periphery of the commutator, connect, by means of suitable wires or conductors $u'$, one with the battery $m$, and through it with one pole of the fixed magnets, and the other directly with the said series of fixed magnets $k$.

In operating the device the electrical current, starting from the battery, passes or may pass through the conducting-wire $u'$ to the spring $r$, and from thence to one of the peripheral parts of the commutator—say the part $r$—from whence the current passes through the wire $t$, screws $s'$, and conducting-wire $u$ to the revolving magnets $i$, the soft iron thereof being magnetized by the current, and thus said revolving magnets are caused to move toward the fixed magnets $k$. This movement of the magnets $i$ causes the shaft $d$ to revolve, and with it the commutator $n$. After passing through the revolving magnets the current passes to the screws $s$, thence through the wire $t'$ to the sections or alternate parts $r'$, and from thence to the spring $p'$, then to the fixed magnets $k$, and again to the battery.

The motion of the commutator or rheotrope changes the relation of the parts $r\ r'$ to the springs $p\ p'$, and as a result the current changes, and thus the motion of the magnets is continued, the effect of the reverse current being the same as is common to this general class of motors.

It will be observed that by the arrangement of the co-operating magnets shown and described larger surfaces are presented to one another than in the construction heretofore employed, by means of which greater power is secured in the motors, as will be understood.

The movement of the motor may be regulated and controlled by any suitable governor, such as the one illustrated.

Having thus described the invention, what I claim as new is—

1. In an electric motor, the combination of a frame and series of magnets secured therein, a shaft and a series of magnets secured thereon, the said magnets of one series alternating with those of the other series, and all of said magnets each having two end plates $k\ k'$, with a hub $k^2$ and wires $k^3$ between, all said parts being arranged and combined substantially as and for the purposes set forth.

2. In a motor, the combination, with a series of magnets having broad end plates with wires wound between, of another series of like construction, movable between the first, the plates of one series being presented to those of the other, substantially as and for the purposes set forth.

In testimony that I claim the foregoing I have hereunto set my hand this 20th day of June, 1888.

ALFRED GARTNER.

Witnesses:
E. L. SHERMAN,
C. H. BALDWIN.